F. KUHN AND J. A. HAND.
ELECTRIC WATER HEATER.
APPLICATION FILED JAN. 25, 1919.
1,363,472.
Patented Dec. 28, 1920.
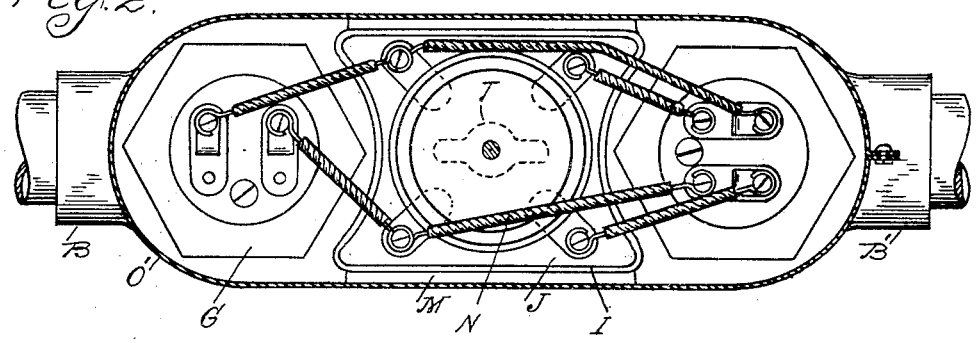
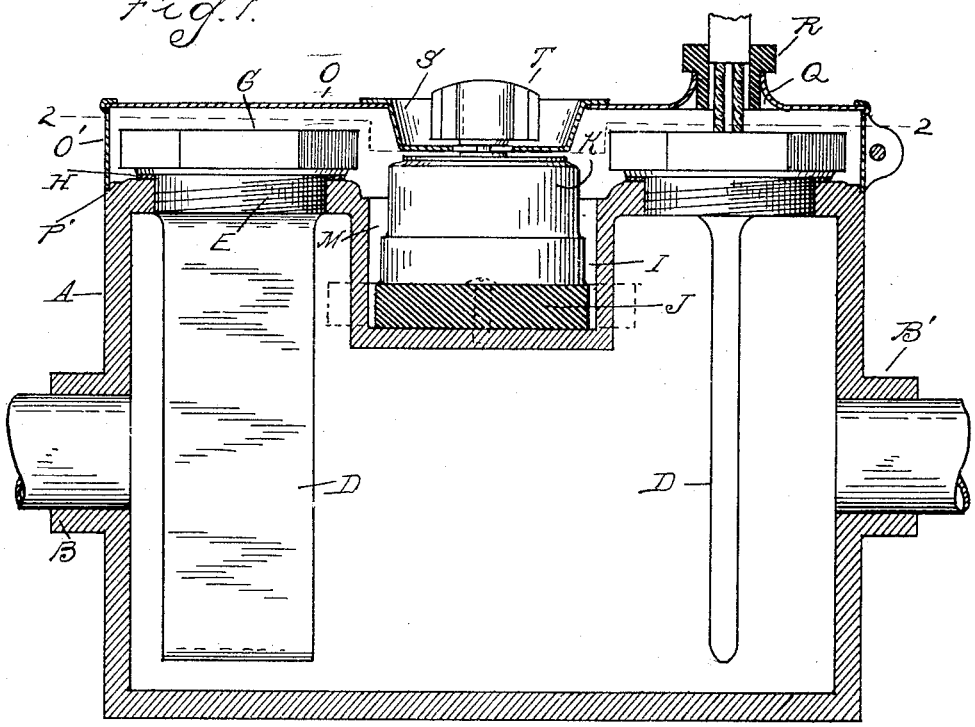
Inventors
Frank Kuhn
Jay A. Hand
By Whittemore Hulbert & Whittemore
Attorneys

UNITED STATES PATENT OFFICE.

FRANK KUHN AND JAY A. HAND, OF DETROIT, MICHIGAN, ASSIGNORS TO AMERICAN ELECTRICAL HEATER COMPANY, OF DETROIT, MICHIGAN, A CORPORATION OF MICHIGAN.

ELECTRIC WATER-HEATER.

1,363,472.      Specification of Letters Patent.      Patented Dec. 28, 1920.

Application filed January 25, 1919. Serial No. 273,079.

*To all whom it may concern:*

Be it known that we, FRANK KUHN and JAY A. HAND, both citizens of the United States of America, residing at Detroit, in the county of Wayne and State of Michigan, have invented certain new and useful Improvements in Electric Water-Heaters, of which the following is a specification, reference being had therein to the accompanying drawings.

The invention relates to electric water heaters and consists in the novel construction of fitting adapted for incorporation in a water conduit system and provided with an electrical heating unit, as hereinafter set forth.

In the drawings:

Figure 1 is a sectional side elevation of the construction;

Fig. 2 is a plan view on line 2—2 of Fig. 1.

A is a hollow casing provided with nipples B B′ preferably arranged opposite each other and adapted for connection with inlet and outlet conduits C C′. D is an incased electrical heating unit which is inserted laterally into the casing A through an aperture E therein, the casing of the unit being preferably provided with a threaded portion F engaging corresponding threads in the aperture E. Above the threaded portion F the casing of the unit D is provided with a hexagonal portion G, by means of which it may screw in or out, and a gasket H or other suitable packing means is placed between the hexagonal head portion G and the casing A.

The casing A is preferably provided with apertures for insertion of two of the units D, and between these units there is formed in the casing A a depression I for receiving an insulator connector block J and an electric switch K mounted thereon. The side walls M of the casing A preferably extend upward on opposite sides of the recess I so as to form a protection for the switch and connector. N are electrical connections between the terminals of the units D and the connector block J, by which the electric current may be controlled by the switch K to pass through one or both of the units. O is a housing for inclosing the terminal connections N, this being preferably formed of sheet-metal having a peripheral portion O′, the lower edge of which engages a grooved bearing P at the upper end of the casing. At one point in this housing is a flanged aperture Q provided with an insulator bushing R through which the service connection passes. The central portion of the housing O is provided with a depressed portion S registering with the switch K and forming a recess for the switch operating handle T.

With the construction described, the unit may be connected into any water conduit, and to secure the desired heating effect the units may be used singly or in multiple. The switch controls the current so that either one or both of the heating units may be thrown into operation. All parts of the switch and electrical connections thereto are housed and protected.

What we claim as our invention is:

1. The combination with a hollow casing having alined inlet and outlet connections thereto, of an armored liquid-proof electrical heating unit laterally inserted within said hollow casing, means for forming a liquid seal between said unit and casing, and a sheet-metal casing surrounding the outer end of said unit for protecting the electrical connections thereto.

2. The combination with a hollow casing having alined inlet and outlet connections, of an armored liquid-proof electrical heating unit laterally inserted in said casing, a threaded plug at the outer end of said unit for engagement with the wall of the casing, a polygonal head at the outer end of said threaded plug, and a sheet-metal casing surrounding said head and housing the electrical connections to the unit.

3. An electric water heater, comprising a hollow casing having nipples on opposite sides for connecting the same into a water conduit, an armored liquid-proof electrical heating unit laterally inserted in said hollow casing, a controlling switch mounted on said casing, and electrical connections between said switch and unit.

4. An electric water heater, comprising a hollow casing having alined nipples for connection into a water conduit, an armored water-proof electrical heating unit laterally inserted into said hollow casing, a recess in said hollow casing, an electric switch located in said recess, electrical connections to said switch and unit, and a hood inclosing said connections, apertured for the passage of the switch handle therethrough.

5. In an electric water heater, a hollow casing having alined nipples for connection into a water conduit and recessed on one side thereof with an aperture adjacent to said recess, an armored water-proof electrical heating unit laterally inserted through said aperture and forming a sealing joint with the wall of said casing, an electric switch in said recess, and electrical connections between said switch and unit.

6. In an electric water heater, a hollow casing having nipples on opposite sides for connection into a water conduit, said casing being of substantially rectangular form and of greater width than thickness, being also provided with a recess in the center of one side thereof with apertures in the walls on opposite sides of said recess, armored waterproof electrical heating units inserted through said apertures, an electric switch in said recess, electrical connections between said switch and units, and a hood for inclosing said connections and switch, apertured for the passage of the switch handle therethrough.

7. An electric water heater, comprising a hollow substantially rectangular casing having nipples at the ends thereof for connection into a water conduit, one of said sides being apertured for the lateral insertion of heating units and having a depression between said apertures forming a recess, armored waterproof heating units inserted through said apertures, a connector block in said recess, a switch mounted on said connector block, electrical connections between said switch and said units, and a hood inclosing said connections, apertured for the passage of the switch handle therethrough.

In testimony whereof we affix our signatures.

FRANK KUHN.
JAY A. HAND.